US011618298B2

(12) United States Patent
Tani (10) Patent No.: US 11,618,298 B2
(45) Date of Patent: Apr. 4, 2023

(54) AIR CONDITIONING EQUIPMENT FOR VEHICLE

(71) Applicant: Mitsubishi Electric Corporation, Tokyo (JP)

(72) Inventor: Masakazu Tani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 848 days.

(21) Appl. No.: 16/603,748

(22) PCT Filed: Apr. 20, 2017

(86) PCT No.: PCT/JP2017/015828
§ 371 (c)(1),
(2) Date: Oct. 8, 2019

(87) PCT Pub. No.: WO2018/193570
PCT Pub. Date: Oct. 25, 2018

(65) Prior Publication Data
US 2020/0114723 A1    Apr. 16, 2020

(51) Int. Cl.
*B60H 1/00*    (2006.01)
*B60H 1/03*    (2006.01)
(Continued)

(52) U.S. Cl.
CPC ..... *B60H 1/00028* (2013.01); *B60H 1/00207* (2013.01); *B60H 1/00328* (2013.01);
(Continued)

(58) Field of Classification Search
CPC ........... B60H 1/00564; B60H 1/00107; B60H 1/00214; B60H 1/00028; B60H 1/039;
(Continued)

(56) References Cited

U.S. PATENT DOCUMENTS 9,487,059 B2 * 11/2016 Tabei ................. B60H 1/00849
2003/0056531 A1 * 3/2003 Nishida ............. B60H 1/00064
62/244
(Continued)

FOREIGN PATENT DOCUMENTS

JP    2012-001036 A    1/2012

OTHER PUBLICATIONS

International Search Report for PCT/JP2017/015828, dated Jul. 18, 2017.

*Primary Examiner* — Gordon A Jones
(74) *Attorney, Agent, or Firm* — Sughrue Mion, PLLC; Richard C. Turner (57) ABSTRACT

In the application, since the flow of air outside the vehicle compartment flowing through the upstream heat exchange part and the flow of air outside the vehicle compartment flowing through the downstream heat exchange part are opposite flows, a second heat exchanger through which the air outside the vehicle compartment flowing from the first fan through the downstream heat exchange part flows, a first heat exchanger is an orthogonal heat exchanger, the second heat exchanger that is a component of a refrigeration cycle execution system, the air in the vehicle compartment, which flows in from the inside air inlet by the rotation of the second fan and is discharged from the outlet outside the vehicle through the first heat exchanger, and the air outside the vehicle compartment, are exchanged with the first heat exchanger, it can be miniaturized along with the improvement of electricity cost.

20 Claims, 5 Drawing Sheets

(51) Int. Cl.
*B60H 3/00* (2006.01)
*B60H 3/02* (2006.01)

(52) U.S. Cl.
CPC ..... *B60H 1/00485* (2013.01); *B60H 1/00785* (2013.01); *B60H 1/00842* (2013.01); *B60H 1/039* (2019.05); *B60H 3/0092* (2013.01); *B60H 3/024* (2013.01); *B60H 1/00564* (2013.01); *B60H 2001/00107* (2013.01); *B60H 2001/00214* (2013.01)

(58) Field of Classification Search
CPC ............ B60H 1/00207; B60H 1/00328; B60H 1/00485; B60H 1/00785; B60H 1/00842; B60H 3/0092; B60H 3/024
See application file for complete search history.

(56) References Cited

U.S. PATENT DOCUMENTS

| | | | |
|---|---|---|---|
| 2011/0009044 A1* | 1/2011 | Seto | B60H 1/00028 454/143 |
| 2011/0036117 A1* | 2/2011 | Frohling | B60H 1/00021 62/507 |
| 2011/0138850 A1* | 6/2011 | Suzuki | F28F 21/06 165/151 |
| 2016/0137022 A1* | 5/2016 | Sakakibara | B60H 1/00035 454/139 |
| 2016/0229266 A1* | 8/2016 | Maeda | B60H 1/0005 |
| 2016/0303941 A1* | 10/2016 | Kinmartin | B60H 1/00064 |
| 2018/0312029 A1* | 11/2018 | Ito | B60H 1/00064 |
| 2019/0176565 A1* | 6/2019 | Shin | B60H 1/00835 |
| 2019/0270359 A1* | 9/2019 | Kato | B60H 1/00028 |

* cited by examiner

FIG.5

Prior Art

AIR CONDITIONING EQUIPMENT FOR VEHICLE

CROSS REFERENCE TO RELATED APPLICATIONS

This application is a National Stage of International Application No. PCT/JP2017/015828 filed Apr. 20, 2017.

TECHNICAL FIELD

The present application relates to air conditioning equipment for vehicle installed in an electrically powered vehicle such as a plug-in hybrid vehicle or an electric vehicle.

BACKGROUND ART

Since the heat loss due to the ventilation of the vehicle is large, the consumption of electric energy in the air conditioning for heating and cooling is large, and the power consumption at the time of air conditioning is significantly reduced, which is a problem of the electric vehicle.

In order to reduce the heat loss due to the ventilation of the vehicle, in the conventional application, a heat exchanger is provided to exchange heat of the air in the vehicle compartment before being exhausted with the air taken in from the outside of the vehicle.

[Patent Literature 1] JP 2012-1036 A

DISCLOSURE OF INVENTION

Technical Problem

In the application of a conventional patent literature, a vehicle outdoor outlet and an inside air inlet are provided in the direction facing the air outlet to the vehicle compartment, but as there are layout restrictions due to the adjacent engine room of the vehicle, air duct routing is complicated. Further, the external shape of the orthogonal heat exchanger where inside air and outside air cross is a square, and is mounted to be inclined to 45 degrees, a triangular waste space (reference numeral 30 in FIG. 5) is generated at the air inlet and outlet of the heat exchanger, and the air conditioning equipment is enlarged. In addition, since the inside air inlet have at two locations, upward and downward, and the air duct layout to the vehicle compartment is difficult, the size is increased.

The present application has been made to solve the above-described problems, and has as the object to reduce the size of an air conditioning equipment for vehicle together with the improvement of the electricity cost.

Solution to Problem

The air conditioning equipment for vehicle according to the present application provides a first air duct provided on one side of a partition panel, a second air duct provided on the other side of the partition panel, a first fan disposed in the first air duct, a second fan disposed in the second air duct, a rotating machine for rotating the first fan and the second fan in the same direction, a first heat exchanger having an upstream heat exchange part and a downstream heat exchange part, wherein; the upstream heat exchange part through which an air outside the vehicle flowed in from an outside air inlet flows by the rotation of the first fan is located between the first fan and an outside air inlet which is an air inlet of a vehicle compartment, the downstream heat exchange part through which the air outside the vehicle flowed from the first fan flows is located between the first fan and the vehicle compartment outlet, and the first heat exchanger in which the flow of air outside the vehicle compartment flowing through the upstream heat exchange part and the flow of air outside the vehicle compartment flowing through the downstream heat exchange part are opposite flows, and a second heat exchanger through which the air outside the vehicle compartment flowing from the first fan through the downstream heat exchange part flows, wherein;

the first heat exchanger is an orthogonal heat exchanger, the second heat exchanger is a heat exchanger that is a component of a refrigeration cycle execution system, the air in the vehicle compartment, which flows in from the inside air inlet by the rotation of the second fan and is discharged from the outlet outside the vehicle through the first heat exchanger, and the air outside the vehicle compartment, are exchanged with the first heat exchanger.

Advantageous Effects of Invention

According to the application, since the air conditioning equipment for vehicle according to the present application comprises a first air duct provided on one side of a partition panel, a second air duct provided on the other side of the partition panel, a first fan disposed in the first air duct, a second fan disposed in the second air duct, a rotating machine for rotating the first fan and the second fan in the same direction, a first heat exchanger having an upstream heat exchange part and a downstream heat exchange part, wherein; the upstream heat exchange part through which an air outside the vehicle flowed in from an outside air inlet flows by the rotation of the first fan is located between the first fan and an outside air inlet which is an air inlet of a vehicle compartment, the downstream heat exchange part through which the air outside the vehicle flowed from the first fan flows is located between the first fan and the vehicle compartment outlet, and the first heat exchanger in which the flow of air outside the vehicle compartment flowing through the upstream heat exchange part and the flow of air outside the vehicle compartment flowing through the downstream heat exchange part are opposite flows, and a second heat exchanger through which the air outside the vehicle compartment flowing from the first fan through the downstream heat exchange part flows, wherein; the first heat exchanger is an orthogonal heat exchanger, the second heat exchanger is a heat exchanger that is a component of a refrigeration cycle execution system, the air in the vehicle compartment, which flows in from the inside air inlet by the rotation of the second fan and is discharged from the outlet outside the vehicle through the first heat exchanger, and the air outside the vehicle compartment, are exchanged with the first heat exchanger, it can be miniaturized along with the improvement of electricity cost.

DESCRIPTION OF EMBODIMENTS

First Embodiment

The heat pump system of the air conditioning system mounted on the electric vehicle provides a compressor that compresses the refrigerant, a heat exchanger unit mounted in the vehicle compartment, an expansion valve that expands the refrigerant, and a heat exchanger mounted outside the vehicle, by a thermal cycle in which the refrigerant circulates by repeating condensation and evaporation, cooling for heat transfer from the vehicle compartment to the outside of the vehicle and heating for heat transfer from the outside of the vehicle to the vehicle compartment become possible.

Specific examples of the first embodiment of the present application will be described below with reference to FIGS. 1 to 4.

Figure 1:
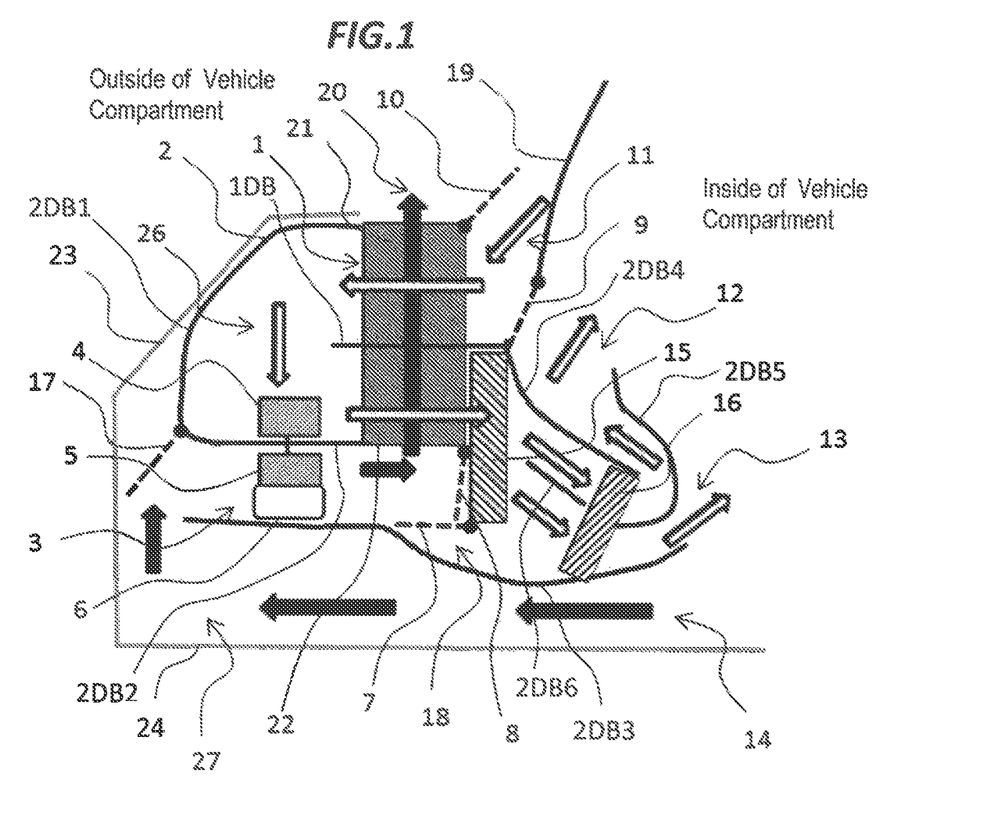
FIG. 1 is a view showing a first embodiment of the present application, and is a longitudinal cross-sectional side view illustrating the air duct configuration in case of heat recovering using a first heat exchanger in the air conditioning equipment for vehicle.

The air conditioning unit 2, which is an air conditioning equipment for vehicle mounted in the vehicle compartment, is configured with, a first heat exchanger 1, an air blower 3, a second valve 7, a first valve 8, a third valve 9, a fourth valve 10, an outside air inlet 11 of the air of the vehicle outdoor, a first vehicle compartment outlet 12, a second vehicle compartment outlet 13, an inside air inlet 14 of the air of the vehicle compartment, a third heat exchanger 15, a second heat exchanger 16, a fifth valve 17, a vehicle outdoor outlet 20, a drain hose 25, a first air duct 26, a second air duct 27, a first partition plate 2DB1, a second partition plate 2DB2, a third partition plate 2DB3, a fourth partition plate 2DB4, a fifth divider 2DB5, and a sixth partition plate 2DB6.

The air blower 3 is an example of the configuration providing a first fan 4 (hereinafter referred to as "first propeller") 4 comprising a first propeller, a second fan 5 (hereinafter referred to as a "second propeller") comprising a second propeller and a rotating machine 6 such as a motor that drives to rotate the first propeller 4 and the second propeller 5. The first propeller 4 and the second propeller 5 are driven by a common rotating machine 6 and rotate in the same direction.

The second heat exchanger 16 is a refrigerant condenser, and has a function to raise the temperature of the air by condensing the refrigerant and by dissipating heat. The third heat exchanger 15 is a refrigerant evaporator, and has a function to lower the temperature of air by evaporating the refrigerant and absorbing heat. The second heat exchanger 16, which is a refrigerant condenser, the third heat exchanger 15, which is a refrigerant evaporator, and the compressor (not shown) are connected by a refrigerant pipe and is configured to perform a cooling/heating cycle. As well known, the second heat exchanger 16, which is a refrigerant condenser, the third heat exchanger 15, which is a refrigerant evaporator, and the compressor (not shown) are a component of the refrigeration cycle execution system.

A temperature sensor is provided at the first vehicle compartment outlet 12 or the second vehicle compartment outlet 13, at the time of cooling, air is passed through the evaporator which is the third heat exchanger 15, at the time of heating, air is passed through the condenser of the second heat exchanger 16, at the time of dehumidification, by passing both the evaporator which is the third heat exchanger 15 and the condenser which is the second heat exchanger 16, as there is no difference between the monitor value of the temperature sensor and the setting in the vehicle compartment, the vehicle compartment temperature and humidity are adjusted.

Hereinafter, the air duct configuration of the air conditioning unit 2 will be described with reference to FIG. 1.

According to the first partition plate 2DB1 of the air conditioning unit, the second partition plate 2DB2 of the air conditioning unit, the third partition plate 2DB3 of the air conditioning unit, the fourth partition plate 2DB4 of air conditioning unit, the fifth partition plate 2DB5 of air conditioning unit, the sixth partition plate 2DB6 of the air conditioning unit, the second valve 7, the first valve 8, the third valve 9, the fourth valve 10, and the fifth valve 17, various air ducts of the air flow exemplified by the outlined arrows and filled arrows in FIGS. 1 to 4 according to the respective applications described later are configured.

According to the front shielding wall 23 and the bottom shielding wall 24, the air conditioning unit 2 is physically and thermally shielded from driving sources (not shown) such as an adjacent engine room.

The first air duct 26 through which the outside air flows is communicated from the outside air inlet 11 outside the outside of the vehicle to the air outlet 12 and 13 into the vehicle compartment via the first propeller 4. The second air duct 27 through which the inside air flows is communicated from the inside air inlet 14 of the air of the vehicle compartment via the second propeller 5 to the outside air outlet 20 to the outside of the vehicle.

The first heat exchanger 1 is installed at the intersection of the first air duct 26 where the upstream side 21 and the downstream side 22 face each other and the air flows by folding back into a U-shape and the second air duct 27 where the air flows linearly. The first heat exchanger 1 is made of a paper material, resin, and metal, and it is possible to exchange heat as the inside air and the outside air flow without being mixed and flow in cross.

The first vehicle compartment outlet 12 is an airway opening that blows dry air on the windshield, the second vehicle compartment outlet 13 is an air duct that blows air to the driver's or passenger's body and feet. In that case, the first valve 8 has an opening degree open to the air inlet of the first heat exchanger 1, the second valve 7 has an opening that closes the bypass of the third heat exchanger 15. The third valve 9 is closed to the outside of the vehicle, the fourth valve 10 is open to the outside of the vehicle, and the fifth valve 17 is open to the vehicle compartment.

The air blower 3 has a first propeller 4 and a second propeller 5 driven by one rotating machine 6, the first propeller 4 is installed at the turn of the first air duct 26, the second propeller 5 is installed in the second air duct 27. The air blower 3 is preferably a sirocco fan having a high maximum static pressure. Further, it is preferable to change the diameter of the first propeller 4 and the second propeller 5 according to the fluid resistance of the first air duct and the second air duct.

The first heat exchanger 1 is configured by stacking, for example, a spacer that separates two layers of air and a holder having a spacer function between the spacers. The upstream side 21 of the first heat exchanger 1 constituting the first air duct 26 is, for example, a material with deodorizing function, as the downstream side 22 is a material having a dust collection function, with the air passing through the upstream side 21 and the downstream side 22, it is possible to improve the air quality of the air outside the vehicle.

In the first heat exchanger 1, the width of the cross section perpendicular to the flowing direction of the air flowing folding back from the outside air inlet 11 is about twice the width of the cross section perpendicular to the direction flowing straight from the inside air inlet 14 is desirable. The reason is that the flow passage cross-sectional area and flow passage length of the outside air in the first heat exchanger 1 and the flow passage cross-sectional area and flow passage length of the inside air in the first heat exchanger 1 are the same, by aligning the flow velocity and the fluid resistance, the heat recovery efficiency can be enhanced, and the air flow rate can be increased.

Next, an air duct configuration in the case of heat recovery using the first heat exchanger 1 will be described with FIG. 1.

The second valve 7 is closed to the bypass, the third valve 9 is closed to the outside of the vehicle, the fourth valve 10 is opened to the outside air, and the fifth valve 17 is opened to the vehicle compartment. A fog detection sensor is installed on the windshield 19 and the opening degree of the first valve 8 is adjusted according to the signal of the fog detection sensor. The first valve 8 is closed to the first heat exchanger 1, when all of the inside air blows into the vehicle compartment, there is no heat loss due to ventilation, but the inside air is breathed by the driver and the passenger, high concentration of CO2 and high humidity appear, the windshield 19 becomes cloudy, causing a feeling of breathlessness.

When breathing of the driver and the passenger become difficult because of high concentration of CO2 or when the windshield becomes cloudy because of high humidity, the first valve 8 to the first heat exchanger 1 is opened, all the inside air is blown to the outdoor air outlet 20, the fresh air having a high degree of freshness is blown from the outside air inlet 11 into the vehicle compartment. In other words, when performing full ventilation by heat exchange between the inside air and the outside air with the first heat exchanger, thermal energy can be recovered and the heat loss due to ventilation is reduced.

The ratio of the air volume of the air blown out to the outdoor air outlet 20 to the outside of the vehicle, and the air volume of the air blown out to the vehicle compartment outlets 12, 13, is judged from the signals from the fog detection sensor and the CO2 detection sensor, the opening degree of the first valve 8 is adjusted. The air blown out to the vehicle compartment outlets 12, 13 is adjusted again in temperature by the second and third heat exchangers 15, 16, and is discharged into the vehicle compartment. In the first heat exchanger 1, as the air discharged to the outside of the vehicle compartment exchanges heat with the outside air from the outside air inlet 11 outside the vehicle, it is possible to reduce the heat loss due to ventilation. It is possible to minimize heat loss due to ventilation by simultaneously using an air duct for recirculating the inside air into the vehicle compartment and an air duct for heat recovery in the first heat exchanger 1.

Figure 2:
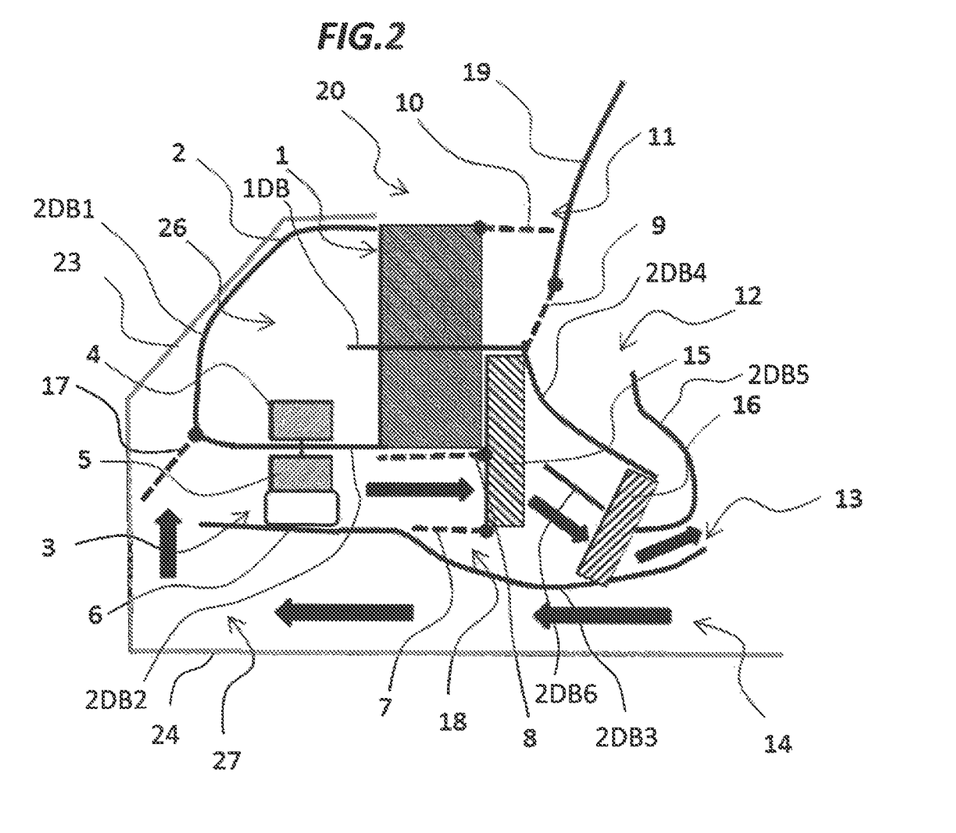
FIG. 2 is a view showing the first embodiment of the present application, and is a longitudinal cross-sectional side view illustrating the air duct configuration in the case of blocking NOx in the air conditioning equipment for vehicle.

Next, the air duct configuration in the case of NOX cutoff will be described with FIG. 2.

The outside air inlet 11 outside the vehicle is provided with an air contamination detection sensor, and When the air contamination detection sensor detects contamination of outside air by NOx and SOx, the fourth valve 10 is closed to the outside of the vehicle in order to shut off the outside air duct to shut them off, by opening the fifth valve 17 with respect to the vehicle compartment, it switches to the air introduction from the inside air inlet 14 from the vehicle compartment. Therefore, it is possible to improve the comfort of the vehicle compartment.

Next, the air duct configuration in the case of performing the defrosting of the windshield 19 will be described with reference to FIG. 3.

Figure 3:
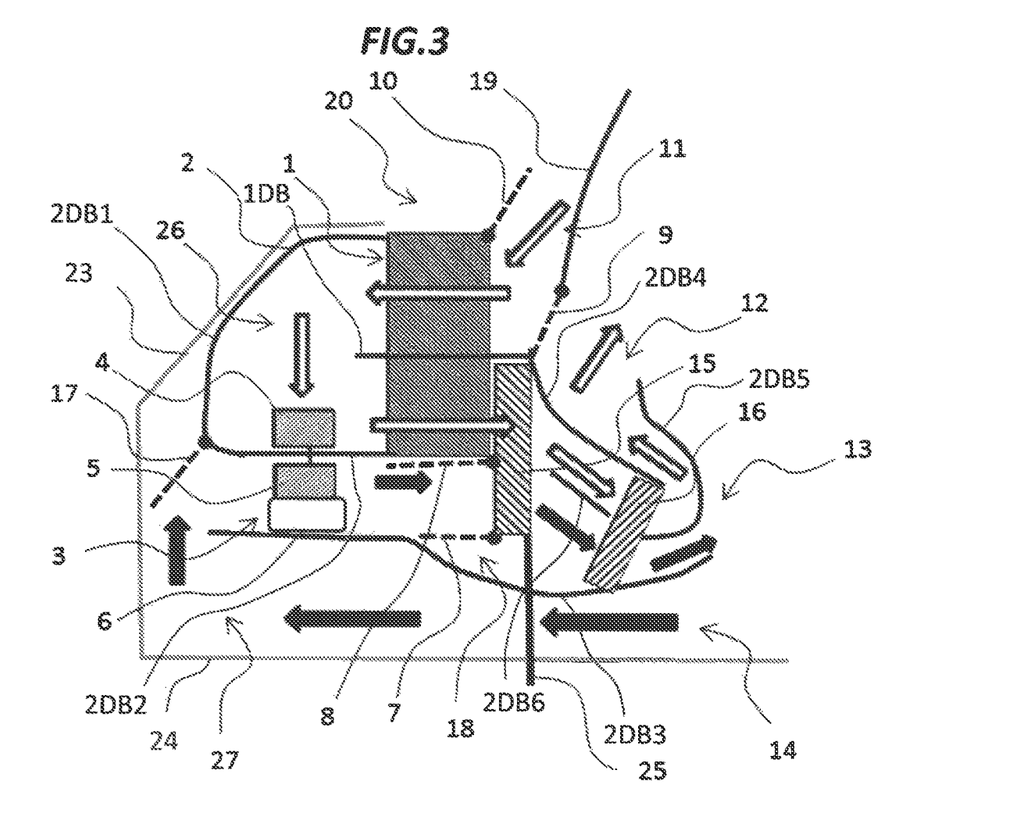
FIG. 3 is a view showing the first embodiment of the present application, and is a longitudinal cross-sectional side view illustrating the air duct configuration in the case of defrosting the windshield in the air conditioning equipment for vehicle.

When the windshield 19 becomes cloudy during heating, as shown in FIG. 3, the air sucked from the outside air inlet 11 is cooled and dehumidified by the evaporator of the third heat exchanger 15, cloudiness is removed by blowing dry air from the first vehicle compartment outlet 12 onto the windshield 19. Water droplets generated by dehumidification are drained by the drain hose 25 of the third heat exchanger 15. In that case, the internal air from the inside air inlet 14, by closing the first valve 8 to the first heat exchanger 1, and by closing the second valve 7 to the third heat exchanger 15, does not pass through the third heat exchanger 15, and is blown out to the vehicle compartment outlet 13 through the bypass 18. The air from the inside air inlet 14 has high humidity, but as it is blown to the second air outlet 13 far from the windshield, it is hard to be a cause of fogging of the windshield. By doing so, without dissipating heat in the first heat exchanger 1 and the third heat exchanger 15, by discharging it into the vehicle compartment air, it is possible to improve the thermal efficiency. When it is desired to completely dehumidify the air from the first and second vehicle compartment outlets 12, 13, by closing the first valve 8 to the first heat exchanger 1, and by opening the second valve 7 with respect to the third heat exchanger 15, both the outside air and the inside air are cooled by the third heat exchanger 15 and dehumidified.

Figure 4:
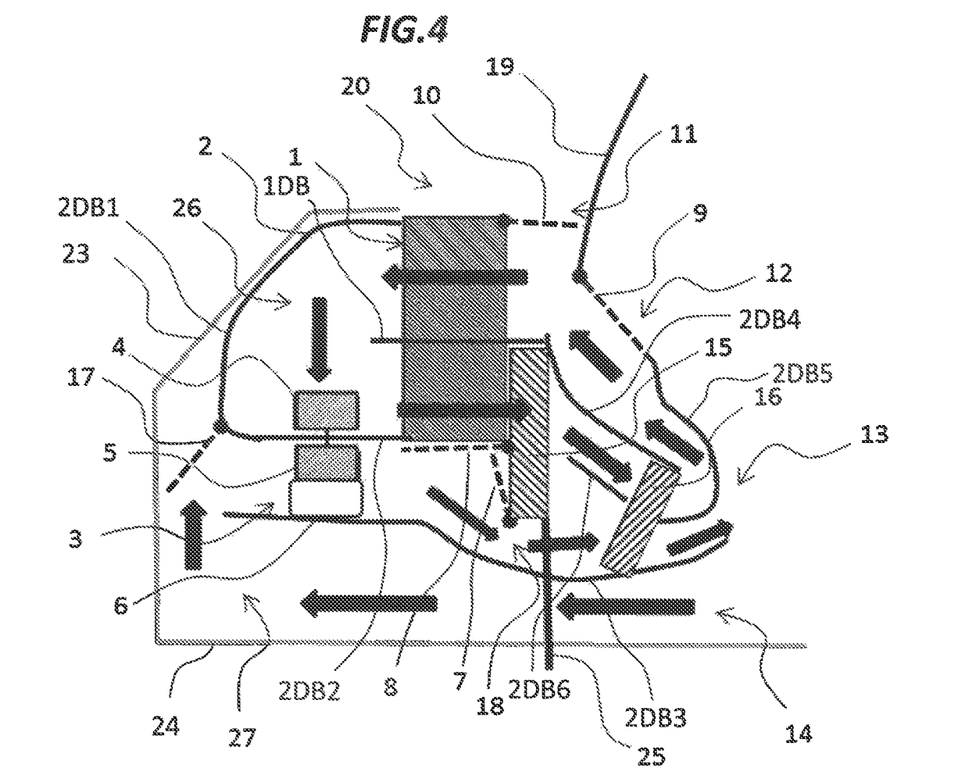
FIG. 4 is a view showing the first embodiment of the present application, and is a longitudinal cross-sectional side view illustrating the air duct configuration in the case of thawing ice from the first heat exchanger in the air conditioning equipment for vehicle.

Next, the air duct configuration in the case of thawing ice from the first heat exchanger will be described.

Under an environment where the outside air temperature is 0° C. or less, the first heat exchanger 1 may freeze. The air duct configuration for thawing it will be described with FIG. 4. The first heat exchanger 1 has an ice detecting means, when ice is detected, the air temperature is raised in the second heat exchanger 16 as condenser, by switching to the air duct which returns the high temperature air to the first heat exchanger 1, and an element of the heat exchanger is thawed. In the state of the air duct, the first valve 8 is closed to the first heat exchanger 1, the second valve 7 is opened to the bypass, the third valve 9 is opened to the outside of the vehicle, the fourth valve 10 is closed to the outside air, and the fifth valve 17 is opened to the vehicle compartment. While air conditioning the vehicle compartment by the air of the second propeller 5, it is possible to melt the freeze of the first heat exchanger 1. The ice detecting means is installed in the air outlet 20 outside the vehicle, the third heat exchanger 15 or the air duct around it, means to judge the case where the wind speed sensor does not have a predetermined wind speed as freezing is desirable.

In the first characteristic configuration of the first embodiment the air conditioning equipment having the air blower and the heat exchanger which is one component of the refrigeration cycle execution system, the fan having a first propeller and the second propeller in one rotating machine, wherein the first propeller and the second propeller blow air in the same direction, the outside air inlet leading to the first propeller, the inside air inlet leading to the second propeller, the partition plate that divides the air flow of the first propeller and the air of the second propeller so that they do not mix, the first heat exchange for exchanging heat between the air of the first propeller and the air of the second propeller by crossing the air flow of the first propeller and the air of the second propeller without mixing, and the second heat exchanger through which the air flow of the first propeller passes after passing through the heat exchanger, are provided, and the second heat exchanger is a component of the refrigeration cycle execution system.

According to the second characteristic configuration of the first embodiment, the position of the outside air inlet is provided adjacent to the windshield at the outside of the vehicle, the position of the inside air inlet is provided at the lower part of the vehicle compartment outlet.

The third characteristic configuration of the first embodiment is that the first heat exchanger is made of a paper material or a resin, and the second heat exchanger is made of metal.

The fourth characteristic configuration of the first embodiment is that the air flow is folded back by the first propeller, and the air flow is straight at the second propeller, further the upstream heat exchange part of the first heat exchanger that exchanges heat with the blowing of the first propeller in a predetermined direction, and the downstream heat exchange part of the first heat exchanger that exchanges heat with the air flow of the first propeller flowing in the direction opposite to the direction are provided.

According to the fifth characterizing feature of the first embodiment, the air sucked from the outside air inlet is folded back and passes through the upstream heat exchange part and the downstream heat exchange part in the first heat exchanger, and the first propeller is mounted between the upstream heat exchange part and the downstream heat exchange part.

The sixth characteristic configuration of the first embodiment has the function of improving different air qualities in the upstream heat exchange part and the downstream heat exchange part of the first heat exchanger.

The seventh characterizing feature of the first embodiment is that, in the first heat exchanger, it has an upstream heat exchange part composed of a material to be deodorized, a downstream heat exchange part, which is made of material to be collected, or an upstream heat exchange part made of a material to be collected, a downstream side heat exchange part comprised with the material to deodorize.

The eighth characterizing feature of the first embodiment is that the aspect ratio of the first heat exchanger is 2:1.

The ninth characterizing feature of the first embodiment is that it has a controller for adjusting the opening degree of the valve, and for judging the fogging by the signal from the sensor, the air from the second propeller leads to the first heat exchanger and the vehicle compartment, the air passage capable of adjusting the air flow distribution ratio into the first heat exchanger and the vehicle compartment by the opening degree of the first valve provided at the inlet of the first heat exchanger, and a sensor that detects fogging that degrades the visibility of the windshield.

The tenth characteristic configuration of the first embodiment has an air duct for returning the air heated by the second heat exchanger, which is one component of the refrigeration cycle execution system, to the first heat exchanger.

According to the eleventh characterizing feature of the first embodiment,
the air passage configured so that the air of the second fan, under the state the air inlet of the first heat exchanger is closed by the first valve, is adjusted an air flow ratio thereof to the air inlet and to the bypass of the third heat exchanger, after that, the second heat exchanger heats the air and blows the air into the vehicle compartment, the air duct in which air from the first fan, after passing through the first heat exchanger, blows out humidity-controlled air being cooled by the third heat exchanger from the third heat exchanger onto the windshield, and the controller for determining the fogging by a signal from the sensor which detects fogging that degrades the visibility of the windshield and adjusting the second valve opening degree, are provided.

The twelfth characteristic configuration of the first embodiment is that the air blower is a sirocco fan.

According to the thirteenth characteristic configuration of the first embodiment, the first fan and the second fan are sirocco fans each of which has different fan diameters relatively.

As the first effect of the first embodiment, at the time of heating, heat energy is recovered by exchanging heat from the high temperature inside air blown out to the outside of the vehicle to the low temperature outside air blown out into the vehicle compartment, the heat load of ventilation in air conditioning of the vehicle can be reduced. As a result, the energy consumption of air conditioning is significantly reduced, it is possible to significantly improve the fuel consumption or electricity cost of the vehicle. During cooling, heat is exchanged from the high temperature outside air blown into the vehicle compartment to the low temperature inside air blown out to the outside of the vehicle, the heat load of ventilation can be reduced.

As a second effect of the first embodiment, the air blower 3 is provided with two propellers 4 and 5 in one rotating machine 6, because the air blowing from the inside air inlet 14 and the air blowing from the outside air inlet 11 in the first heat exchanger 1 can be performed by one fan 3, the air conditioning unit 2 can be miniaturized.

Figure 5:
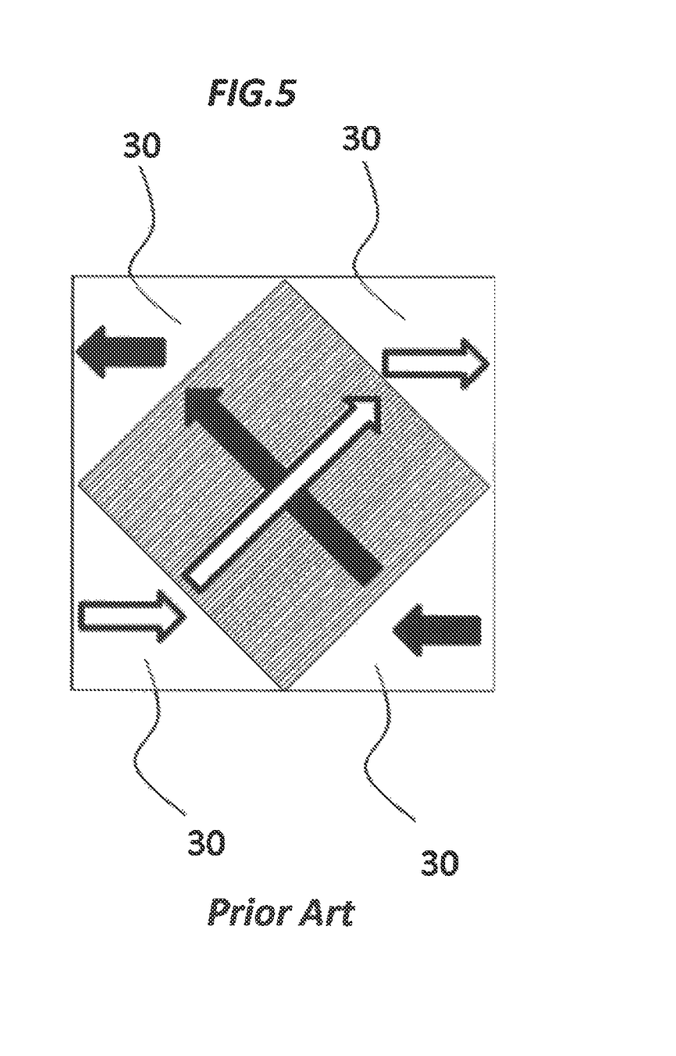
FIG. 5 is a longitudinal cross-sectional side view of the first heat exchanger for explaining the installation mode of the first heat exchanger and the problems thereof in the conventional air conditioning equipment for vehicle.

As a third effect of the first embodiment, in the first heat exchanger 1, the air from the outside air inlet 11 is folded back and blown, and the external shape of the first heat exchanger 1 is made rectangular, compared to the case where the outer shape shown in FIG. 5, it becomes possible to reduce the distance between the air blower 3 and the third heat exchanger 15 without generation of triangular waste space 30, since the space around the outside air inlet 11 can be effectively used, the air conditioning unit 2 can be miniaturized.

As a fourth effect of the first embodiment, compared with the case where the outer shape of the first heat exchanger 1 is square, by turning it back as a rectangle and letting the air flow, the area of the air duct perpendicular to the air flow is reduced, under the condition that the air volume is the same, the flow velocity of air is improved. As a result, in the first heat exchanger 1, the heat transfer efficiency in the temperature boundary layer is increased, whereby the heat recovery efficiency is improved.

As a fifth effect of the first embodiment, the air duct configuration on which the first heat exchanger 1 is mounted is controlled using a valve, heat recovery control, air pollution control, windshield defrost operation, and first heat exchanger defrost operation become possible, it is possible not only to reduce the ventilation loss but also to improve the vehicle compartment comfort and the air conditioning reliability of the air conditioning unit 2.

As a general feature and effect of the first embodiment, in the heat exchanger in which the inside air and the outside air cross each other, the external shape is made rectangular and the air duct is made to be a folded structure, it is possible to improve the freedom of the air duct layout. In addition, by making the heat exchanger having a rectangular outer shape upright, wasted space can be eliminated and the size can be reduced. The air duct is switched by using a valve, and by sharing the inside air inlet, the number of inlets can be reduced to one, and the air conditioning can be miniaturized.

In the drawings, the same reference numerals indicate the same or corresponding parts.

In the present application, each embodiment can be appropriately modified, omitted, and combined within the scope of the application.

REFERENCE SIGNS LIST

1. First heat exchanger
2. Air conditioning unit
3. Air blower
4. First propeller (first fan)
5. Second propeller (second fan)
6. Rotating machine
7. Second valve
8. First valve
9. Third valve
10. Fourth valve
11. Outside air inlet
12. First vehicle compartment outlet
13. Second vehicle compartment outlet
14. Inside air inlet
15. Third heat exchanger
16. Second heat exchanger
17. Fifth valve
18. Bypass
19. Windshield
20. Vehicle outdoor outlet
21. Upstream heat exchange part of the first heat exchanger
22. Downstream heat exchange part of the first heat exchanger
23. Front shielding wall
24. Bottom shielding wall
25. Drain hose
26. First air duct
27. Second air duct
30. Triangular waste space at the inlet and the outlet of the heat exchanger with a square outer shape,
1DB Partition panel of the first heat exchanger
2DB1 First partition panel of the air conditioning unit
2DB2 Second partition panel of the air conditioning unit
2DB3 Third partition panel of the air conditioning unit
2DB4 Fourth partition panel of the air conditioning unit
2DB5 Fifth partition panel of the air conditioning unit
2DB6 Sixth partition panel of the air conditioning unit

The invention claimed is:

1. An air conditioning equipment for vehicle, comprising:
a first air duct provided on one side of a partition panel,
a second air duct provided on the other side of the partition panel,
a first fan disposed in the first air duct,
a second fan disposed in the second air duct,
a rotating machine for rotating the first fan and the second fan in the same direction,
a first heat exchanger having an upstream heat exchange part and a downstream heat exchange part, wherein; the upstream heat exchange part through which an air outside the vehicle flowed in from an outside air inlet flows by the rotation of the first fan is located between the first fan and an outside air inlet which is an air inlet of a vehicle compartment, the downstream heat exchange part through which the air outside the vehicle flowed from the first fan flows is located between the first fan and the vehicle compartment outlet, and the first heat exchanger in which the flow of air outside the vehicle compartment flowing through the upstream heat exchange part and the flow of air outside the vehicle compartment flowing through the downstream heat exchange part are opposite flows, and
a second heat exchanger through which the air outside the vehicle compartment flowing from the first fan through the downstream heat exchange part flows,
wherein;
the first heat exchanger is an orthogonal heat exchanger,
the second heat exchanger is a heat exchanger that is a component of a refrigeration cycle execution system,
the air in the vehicle compartment, which flows in from the inside air inlet by the rotation of the second fan and is discharged from the outlet outside the vehicle through the first heat exchanger, and the air outside the vehicle compartment, are exchanged with the first heat exchanger.

2. The air conditioning equipment for vehicle according to claim 1, wherein
the flow direction of the air flowing through the upstream heat exchange part and the air flowing through the downstream heat exchange part due to the rotation of the first fan is horizontal, and
the flow direction of the air passing through the first heat exchanger by the second fan is vertical.

3. The air conditioning equipment for vehicle according to claim 1, wherein
the outside air inlet is provided outside the vehicle adjacent to the windshield, and
the inside air inlet is provided at a lower part of the vehicle compartment outlet.

4. The air conditioning equipment for vehicle according to claim 1, wherein
the first heat exchanger is made of paper material or resin, and
the second heat exchanger is made of metal.

5. The air conditioning equipment for vehicle according to claim 3, wherein
the first heat exchanger is made of paper material or resin, and
the second heat exchanger is made of metal.

6. The air conditioning equipment for vehicle according to claim 1, wherein
the upstream heat exchange part and the downstream heat exchange part have functions to improve different air qualities.

7. The air conditioning equipment for vehicle according to claim 4, wherein
the upstream heat exchange part and the downstream heat exchange part have functions to improve different air qualities.

8. The air conditioning equipment for vehicle according to claim 5, wherein the upstream heat exchange part and the downstream heat exchange part have functions to improve different air qualities.

9. The air conditioning equipment for vehicle according to claim 6, wherein
one of the upstream heat exchange part and the downstream heat exchange part is made of a material to be deodorized, and the other is made of a material to be dusted.

10. The air conditioning equipment for vehicle according to claim 8, wherein
one of the upstream heat exchange part and the downstream heat exchange part is made of a material to be deodorized, and the other is made of a material to be dusted.

11. The air conditioning equipment for vehicle according to claim 1, wherein
the longitudinal length of the first heat exchanger is longer than the lateral length of the first heat exchanger.

12. The air conditioning equipment for vehicle according to claim 10, wherein
the longitudinal length of the first heat exchanger is longer than the lateral length of the first heat exchanger.

13. The air conditioning equipment for vehicle according to claim 11, wherein
an aspect ratio of the first heat exchanger is 2:1.

14. The air conditioning equipment for vehicle according to claim 1, wherein
the air from the second fan leads to the first heat exchanger and the vehicle compartment, by an opening degree of a first valve provided at the inlet of the first heat exchanger, an air duct is configured in which the distribution ratio of the air flow into the first heat exchanger and the air flow into the vehicle compartment can be adjusted, and
a sensor which detects fogging that degrades the visibility of the windshield, and a controller which determines the fogging by a signal from the sensor and adjusts the opening degree of the first valve are provided.

15. The air conditioning equipment for vehicle according to claim 12, wherein
the air from the second fan leads to the first heat exchanger and the vehicle compartment, by an opening degree of a first valve provided at the inlet of the first heat exchanger, an air duct is configured in which the distribution ratio of the air flow into the first heat exchanger and the air flow into the vehicle compartment can be adjusted, and
a sensor which detects fogging that degrades the visibility of the windshield, and a controller which determines the fogging by a signal from the sensor and adjusts the opening degree of the first valve are provided.

16. The air conditioning equipment for vehicle according to claim 1, wherein
an air passage for returning an air heated by the second heat exchanger to the first heat exchanger is provided.

17. The air conditioning equipment for vehicle according to claim 15, wherein
an air passage for returning an air heated by the second heat exchanger to the first heat exchanger is provided.

18. The air conditioning equipment for vehicle according to claim 1, wherein comprising;
a third heat exchanger which absorbs heat by evaporating the refrigerant,
an air passage configured so that the air of the second fan, under a state the air inlet of the first heat exchanger is closed by the first valve, is adjusted an air flow ratio thereof to the air inlet and to the bypass of the third heat exchanger, after that, the second heat exchanger heats the air and blows the air into the vehicle compartment,
an air duct in which air from the first fan, after passing through the first heat exchanger, blows out humidity-controlled air being cooled by the third heat exchanger from the third heat exchanger onto the windshield, and
a controller for determining the fogging by a signal from the sensor which detects fogging that degrades the visibility of the windshield and adjusting the second valve opening degree.

19. The air conditioning equipment for vehicle according to claim 1, wherein
at least one of the first fan and the second fan is a sirocco fan.

20. The air conditioning equipment for vehicle according to claim 1, wherein
the first fan and the second fan are sirocco fans each of which has different fan diameters relatively.

* * * * *